United States Patent [19]
Markbreiter et al.

[11] Patent Number: 5,596,884
[45] Date of Patent: Jan. 28, 1997

[54] CRYOGENIC TREATMENT OF LANDFILL GAS TO REMOVE TROUBLESOME COMPOUNDS

[75] Inventors: Stephen J. Markbreiter, Edison, N.J.; Irving Weiss, Merrick, N.Y.

[73] Assignee: Kryos Energy Inc., New York, N.Y.

[21] Appl. No.: 578,856

[22] Filed: Dec. 26, 1995

[51] Int. Cl.$^6$ .................................... F25J 3/00
[52] U.S. Cl. .................................. 62/633; 62/634
[58] Field of Search .............................. 62/632, 633, 634

[56] References Cited

U.S. PATENT DOCUMENTS

| | | | |
|---|---|---|---|
| 4,266,958 | 5/1981 | Cummings | 62/633 |
| 4,406,774 | 9/1983 | Cummings et al. | 62/633 |
| 4,711,093 | 12/1987 | Markbreiter et al. | 62/87 |

Primary Examiner—Ronald C. Capossela
Attorney, Agent, or Firm—Paul W. Garbo

[57] ABSTRACT

The cryogenic treatment of landfill gas removes troublesome compounds that cause severe corrosion of combustion engines in which the gas is used as fuel. It involves compressing the gas to an elevated pressure and isenthalpically expanding the gas to chill the gas to a temperature below –20 ° F. The compressed gas is first cooled to eliminate moisture as condensate. Methanol is injected into the gas so that it can be deeply chilled without forming ice with residual moisture in the gas. An aqueous methanol condensate containing troublesome compounds forms in, and is removed from, the deeply chilled gas before it is expanded to provide refrigeration for chilling the gas. By adding water to the aqueous methanol, the troublesome compounds lose solubility in diluted methanol and form a supernatant layer that can be separated for disposal. The diluted methanol can be recycled.

12 Claims, 1 Drawing Sheet

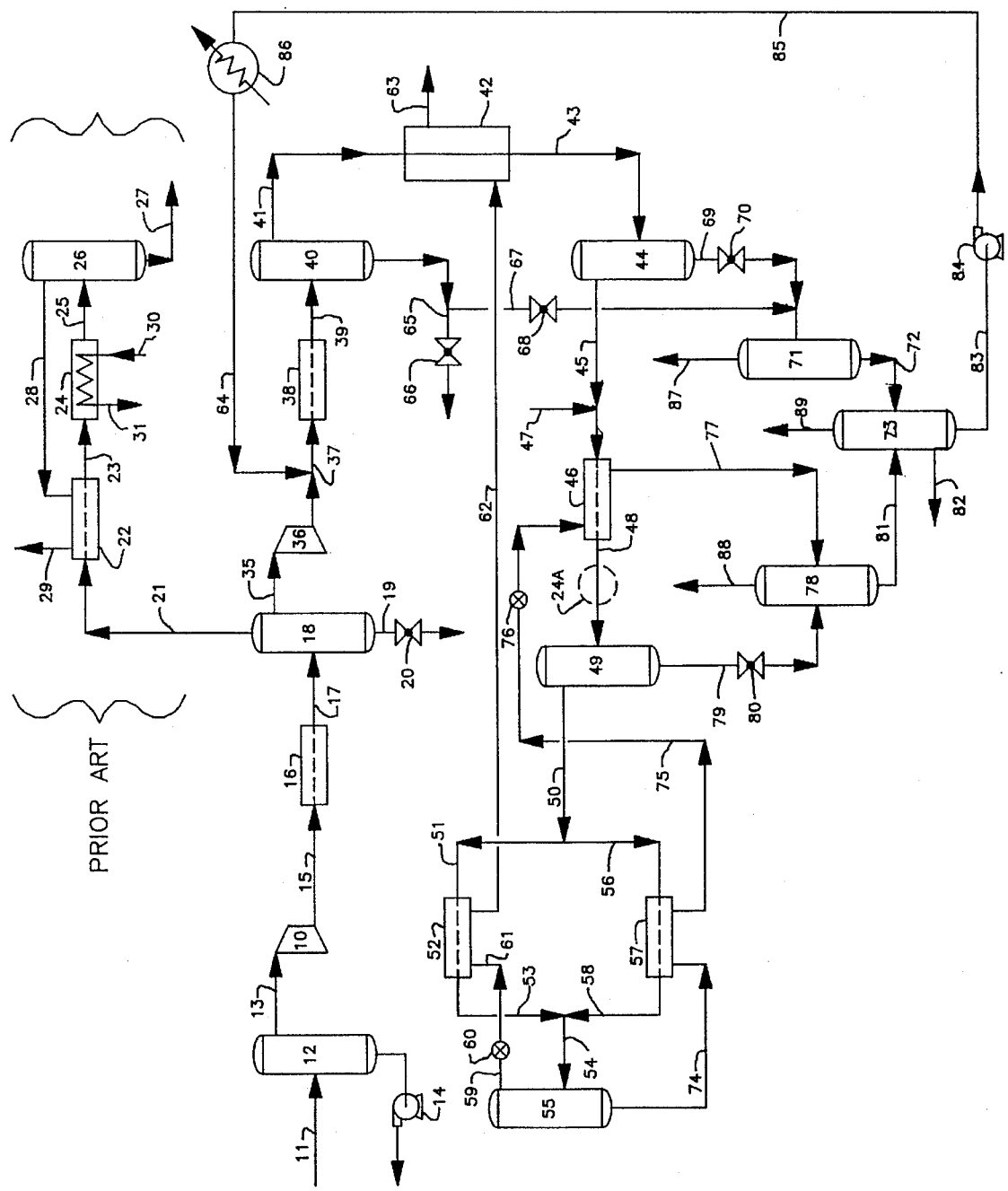

CRYOGENIC TREATMENT OF LANDFILL GAS TO REMOVE TROUBLESOME COMPOUNDS

BACKGROUND OF THE INVENTION

This invention relates to a cryogenic treatment of landfill gas to reduce its content of moisture and a mixture of undesirable vapors, such as halogenated, aromatic and oxygen-containing organic compounds. More particularly, the invention involves compressing landfill gas to a high pressure and then expanding it isenthalpically to a cryogenic temperature to effect the separation of undesirable compounds therefrom.

The gas formed in many landfills is drawn to utilize its methane content which is generally at least about 50% by volume. About 90% of the remainder of the gas is carbon dioxide. The total composition of landfill gas includes moisture and very small or trace amounts of halogenated organic compounds such as dichloroethane, aromatic hydrocarbons such as toluene, and oxygen-containing hydrocarbons such as acetone; this variable miscellany of compounds that are mostly air pollutants will hereinafter be referred to by the collective term, troublesome compounds.

Landfill gas is currently utilized either as fuel in a combustion engine or as feed to a plant that separates it into high-purity methane and even high-purity carbon dioxide. U.S. Pat. Nos. 4,252,548 and 4,704,146 teach the recovery of methane and carbon dioxide, respectively, from landfill gas.

The gas from landfills has, to date, been utilized mostly as fuel in combustion engines in spite of the serious corrosion that necessitates frequent repairs of each engine, often less than four months apart. To the cost of such frequent repairs must be added the financial loss inherent in the down-time.

The rapid corrosion of combustion engines running on landfill gas is associated with the aforesaid miscellany of troublesome compounds. Upon combustion in an engine, every chlorinated hydrocarbon, such as chloro-benzene, yields very corrosive hydrogen chloride.

Accordingly, a principal object of this invention is to provide a cryogenic process of treating landfill gas to materially reduce its corrosiveness when fed to combustion engines.

Another important object is to minimize the escape of air-pollutants such as hydrogen halides into the atmosphere when landfill gas is burned.

A further object is to provide a process of chilling landfill gas to sub-freezing temperatures after adding methanol to the gas.

A still further object is to recover and recycle the methanol used in chilling landfill gas to sub-freezing temperatures.

These and other features and advantages of the invention will be apparent from the description which follows.

SUMMARY OF THE INVENTION

In accordance with this invention, landfill gas is chilled to cryogenic temperatures (below −20° F.) to reduce its content of moisture and miscellany of troublesome compounds. The gas is chilled by compression to an elevated pressure and expanding the compressed gas to drop its temperature through the Joule-Thompson effect. To avoid the formation of ice by the moisture in the gas, methanol is injected into the compressed gas before it is chilled to a temperature below the freezing point of water. The temperature of landfill gas with added methanol is reduced in several steps to a cryogenic temperature below about −25° F. A substantial portion of the moisture therein as well as the added methanol is condensed into aqueous methanol.

While water is condensed and separated from the gas after each step of temperature reduction, a predominant portion of the methanol is separated as aqueous methanol after the temperature-reduction steps that reach temperatures below about 50° F. This aqueous methanol is advantageously recycled as the methanol injected into the compressed gas. Fresh methanol is also added to the gas as make-up for the very small losses of methanol in the vented off gases and waste water separated from the landfill gas during its stepwise chilling to an ultimate low temperature below about −25° F.

BRIEF DESCRIPTION OF THE DRAWINGS

The further description of the invention will be elucidated by reference to the appended drawing which is a flowsheet showing a preferred embodiment of the invention as well as showing a widely used process for comparative purposes.

DESCRIPTION OF A PREFERRED EMBODIMENT

To highlight the advance of the invention over the prevalent prior art, the description will first present a widely used treatment of landfill gas prior to its combustion in engines that drive electric generators.

A common gas delivery system comprises compressor 10 to draw landfill gas and entrained water through pipe 11 which is connected to a group of well casings (not shown) in the landfill and which discharges into separator 12. The water-saturated landfill gas passes from separator 12 through pipe 13 into compressor 10. Water is drained from separator 12 through pump 14 which discharges into a disposal site, usually the landfill. Hot compressed gas flows from compressor 10 through pipe 15 and air-cooled exchanger 16 from which the cooled gas passes via pipe 17 to separator 18. Water drops to the bottom of separator 18, which is the end of the gas delivery system, and is sent to disposal, usually in the landfill, through pipe 19 and control valve 20.

According to current treatment of gas at several landfills, the delivered, water-saturated gas leaves the top of separator 18 via pipe 21 connected to precooler exchanger 22. Thence, the gas flows through pipe 23 and refrigerated exchanger 24, discharging therefrom via pipe 25 into separator 26. The gas passing through refrigerated exchanger 25 is chilled to a temperature slightly above 32° F., say about 35° F. A much lower temperature would be preferable to reduce the content of troublesome vapors and moisture in the gas, but must be avoided to prevent the deposition of ice in, and plugging of, exchanger 24. Separated water is sent to disposal by pipe 27 while gas flows from separator 26 through pipe 28 and precooler 22 to pipe 29 which feeds engines (not shown) used to drive electric generators. A refrigerant flows through pipe 30 into exchanger 24 and exits via pipe 31.

while the moisture content of the landfill gas leaving the conventional treatment plant via pipe 29 has been somewhat reduced, extremely little of the troublesome compounds originally in the gas has been eliminated. Hence, when this gas is fed to combustion engines, the engines suffer the severe corrosion attributed to the troublesome compounds and very corrosive hydrogen halides, principally hydrogen chloride, formed during combustion.

In contrast to the current inadequate practice, the improved treatment of landfill gas to eliminate destructive, troublesome compounds involves, pursuant to this invention, chilling the gas to a cryogenic temperature by compressing and then isenthalpically expanding the gas. This is made possible by the injection of a small quantity of methanol into the landfill gas before it is chilled to a temperature below the freezing point of water. The economic viability of methanol injection is enhanced by recovering methanol as an aqueous condensate in the stepwise chilling of the landfill gas and by recycling the aqueous methanol by re-injection into the gas before it is chilled to the freezing point of water.

Pursuant to the invention, the landfill gas at the top of separator 18, instead of flowing through pipe 21 and the apparatus connected thereto, all of which has been replaced, passes through pipe 35, compressor 36, pipe 37, air-cooled exchanger 38 and pipe 39 into separator 40. The stream discharging into separator 40 contains recycled aqueous methanol injected by pipe 64 into pipe 37. The separated gas leaves separator 40 through pipe 41, heat exchanger 42 and pipe 43 to enter separator 44.

Gas from the top of separator 44 flowing through pipe 45 to heat exchanger 46 has a small quantity of fresh methanol added thereto via pipe 47. Gas then passes from exchanger 46 through pipe 48 to separator 49. A major portion of the gas leaving the top of separator 49 through pipe 50 flows via pipe 51 through exchanger 52 and pipes 53, 54 into separator 55, while the small remainder of gas in pipe 50 is diverted through pipe 56 exchanger 57 and pipes 58, 54 into separator 55.

Gas rising to the top of separator 55 flows through pipe 59 and expansion valve 60 to drop the temperature of the gas because of the Joule-Thompson effect. The very cold gas then passes through pipe 61, exchanger 52, pipe 62, exchanger 42 and pipe 63 which supplies the treated landfill gas to combustion engines. A large part of the refrigeration in the expanded gas is transferred in exchanger 52 to the gas flowing therethrough before it discharges into separator 55 to effect a further elimination of water, methanol and troublesome compounds that cause corrosion in combustion engines and lead to air pollutants in the discharge gases of such engines.

The economic advantage of the novel treatment process, that greatly reduces the content of troublesome compounds in landfill gas and thus materially decreases the rate of corrosion in combustion engines consuming that gas, is enhanced by the recovery and reuse of the methanol added to the gas before its temperature is reduced to and below the freezing point of water.

The liquid, largely water, collecting in separators 40, 44, 71 and the liquid, laden with methanol and troublesome compounds, collecting in separators 49, 55, 78 ultimately reach decanter 73 wherein the liquids mix and form an upper layer, rich in unwanted troublesome compounds, and a lower layer of aqueous methanol. The upper layer is withdrawn through pipe 82 for proper disposal. The lower layer comprising essentially water and a minor proportion of methanol is recirculated by pipe 83, pump 84, pipe 85, heated exchanger 86 and pipe 64. Upon discharge into pipe 37 through which landfill gas is flowing, the aqueous methanol is substantially entirely vaporized so that very little methanol drops out with the water condensate formed in exchanger 38 and collected in separator 40. Part of the water drained from separator 40 by pipe 65 and valve 66 flows to a disposal site and part of it flows via pipe 67, valve 68 and pipe 69 into separator 71. To the limited extent that methanol is lost with the water discarded by pipe 65, make-up methanol is added by pipe 47 to the gas in pipe 45. Make-up methanol also replaces a trivial amount of methanol remaining in the treated gas leaving the treatment plant through pipe 63 and a trivial amount in the liquid layer of troublesome compounds withdrawn from decanter 73 by pipe 82 for proper disposal.

Water in separator 44 also flows through pipe 69 and valve 70 into separator 71 wherein some degassing occurs before the water drains via pipe 72 into decanter 73. Simultaneously, liquid flows from separator 49 through pipe 79 and valve 80 into separator 78, and deeply chilled liquid passes from separator 55 via pipe 74, exchanger 57, pipe 75, expansion valve 76, exchanger 46 and pipe 77 to separator 78. The liquid, rich in methanol and troublesome compounds, collected in separator 78, wherein degassing occurs, discharges via pipe 81 into decanter 73 wherein all the liquids from pipes 72, 81 mix and separate into an upper reject layer and a lower recycle layer of aqueous methanol. Inasmuch as the liquid streams flowing into separators 71, 78 and decanter 73 are at pressures below those of preceding separators 40, 44, 49, 55, small amounts of dissolved gases, such as carbon dioxide and methane are released from these liquid streams together with water vapor containing minute amounts of methanol. The gases in separators 71, 78 and decanter 73 are vented through pipes 87, 88, 89, respectively.

The very substantial removal of troublesome compounds from landfill gas before it is supplied as fuel to combustion engines is achieved by its passage, as just described, through apparatus units 36 to 63, because aqueous methanol is re-injected by pipe 64 into the compressed gas passing from compressor 36 through pipe 37. The major portion of moisture in the compressed and cooled landfill gas drops out of the gas as condensate in separator 40 and is sent to disposal via pipe 65 and valve 66. A minor fraction of the water in pipe 65 is diverted by branch pipe 67 and valve 68 for degassing in separator 71 wherein the water from separator 44 is also degassed. Degassed water passes from separator 71 through pipe 72 into decanter 73. Slightly aqueous methanol containing troublesome compounds flows from separator 55 through pipe 74, exchanger 57, pipe 75, valve 76, exchanger 46 and pipe 77 into degassing separator 78. Simultaneously, liquid from separator 49 discharges via pipe 79 and valve 80 into degassing separator 78 from which liquid flows via pipe 81 into decanter 73.

The water discharged via pipe 72 into decanter 73 and the slightly aqueous methanol laden with troublesome compounds entering via pipe 81 mix therein and form an upper oily layer rich in troublesome compounds and a lower layer of aqueous methanol containing approximately 25% of methanol and 75% of water on a volume basis. The purpose of having a controlled small portion of the waste water in pipe 65 flow through a branch pipe 67, control valve 68, degassing separator 71 and pipe 72 into decanter 73 is to ensure the formation of two liquid layers. The liquid discharged by pipe 81 into decanter 73 is a slightly aqueous methanol solution of troublesome compounds which are essentially insoluble in water. Hence, the water supplied by pipe 69 and augmented by pipe 67 so dilutes the methanol which is water-soluble that the troublesome compounds drop out of solution and form an upper organic layer containing troublesome compounds and a lower aqueous layer containing methanol. All of the water drained from separator 44 is insufficient for the proper formation of two layers and for this reason is supplemented by water from separator 40.

The upper layer with troublesome compounds is withdrawn from decanter 73 through pipe 82 for proper disposal while the lower layer of aqueous methanol flows via pipe 83 to pump 84 that recycles it through pipe 85 and heated exchanger 86 to pipe 64 used to inject the aqueous methanol into the landfill gas undergoing treatment in accordance with this invention. The aqueous methanol (about 25% methanol by volume) recycled from decanter 73 is too dilute to prevent the formation of ice during the chilling of the landfill gas to a cryogenic temperature.

Therefore, the recycle stream is heated in exchanger 86 sufficiently so that, upon injection into the hot compressed landfill gas flowing in pipe 37, it will be substantially completely vaporized. Then, by cooling the gas stream as it passes through exchanger 38, some water is condensed and separated from the landfill gas in separator 40; thus, in effect, the recycled aqueous methanol has been fractionated by the removal of water. Further fractionation is achieved as the gas stream is cooled in exchanger 42 and water condensate is removed from the stream in separator 44. Consequently, the methanol concentration relative to that of moisture in the landfill gas leaving separator 44 is almost high enough to prevent ice formation while the gas is being chilled stepwise to a cryogenic temperature. The small amount of fresh methanol added to the gas via pipe 47 as make-up for the small loss of methanol at various points in the process ensures the prevention of ice formation during the chilling of the gas.

As an example illustrative of the invention, landfill gas is delivered by compressor 10 through air-cooled exchanger 16 and separator 18 to pipe 35 at a pressure of 29 psia (pounds per square inch absolute) and contains, on a volume basis, 53.1% methane, 43.5% carbon dioxide, 3.3% moisture and a miscellany of troublesome compounds totalling 0.081%. Thence, the gas flowing at the hourly rate of 77,100 standard cubic feet leaves compressor 36 through pipe 37 at a pressure of 300 psia and temperature of 220° F. and receives an injection via pipe 64 of recycled aqueous methanol at the same pressure and temperature. The aqueous methanol (25% methanol) injection amounting volumetrically to only 1.8% based on the compressed gas becomes vaporized and after passage through air-cooled exchanger 38 discharges at a temperature of 100° F. into separator 40 where condensate is removed via pipe 65; most (about 75% to 80%) of this condensate flows through valve 66 to a disposal site. The condensate is water containing about 0.1% troublesome compounds and even less dissolved carbon dioxide and methanol. Thus, the injected aqueous methanol undergoes fractionation by being first vaporized in pipe 37 and then cooled in exchanger 38 to drop out water with only a trace of methanol.

The compressed gas flows from separator 40 through pipe 41 and exchanger 42 wherein it is cooled to 40° F. and discharged by pipe 43 into separator 44. Water condensate is again removed and drained through pipe 69 and discharges from expansion valve 70 at a pressure of 31 psia and temperature of 33° F. At the same time, a small portion (23%) of the water flowing at 100° F. through pipe 65 is diverted by branch pipe 67 and valve 68 for mixing with the water at 33° F. The combined waters at 67° F. flow into degassing separator 71 at a pressure of 31 psia.

The compressed landfill gas at a temperature of 40° F. passes from separator 44 via pipe 45 to exchanger 46 wherein it is cooled very slightly to 39° F. Fresh make-up methanol is introduced by pipe 47 into pipe 45 at the rate of 7.7 pounds per hour. Condensate collected in separator 49 is about 76.2% methanol, 14.0% carbon dioxide, 3.2% water, 1.0% methane and 5.6% troublesome compounds. Hence, a first significant separation of troublesome compounds from the landfill gas has been accomplished.

The gas leaving separator 49 via pipe 50 is divided 98.4% into major stream 51 and 1.6% into minor stream 56. Major stream 51 is chilled to −29.1° F. in exchanger 52 while minor stream 56 is chilled to −24° F. in exchanger 57. Both streams discharge into separator 55 at −29° F. where condensate is removed by pipe 74. This liquid is 40.3% methanol, 46.1% carbon dioxide, 6.8% water, 1.7% methane and 5.1% troublesome compounds. Thus, another substantial elimination of troublesome compounds from the landfill gas has been achieved.

The cleaned gas from separator 55 at 291 psia and −29° F. is expanded isenthalpically by passage through valve 60 to 26 psia and −66° F.; it is the stream that in exchanger 52 chills the major gas stream. The cleaned gas passes at 20° F. via pipe 62 to exchanger 42 to cool counter flowing landfill gas and flows at 22 psia and 97° F. through pipe 63 to combustion engines that drive electric generators. This gas at most has only 15% of the troublesome compounds originally in it.

The liquid drained from separators 49, 55 which are rich in methanol and troublesome compounds could be sent to disposal if the cost of methanol was considered acceptable at a particular site. However, in most cases, the recycling of methanol is clearly preferred for the economic attractiveness of the new process. Liquid from separator 55 at −29° F. used to chill the minor gas stream in exchanger 57 issues at 24° F. and its pressure is dropped from 291 psia to 33 psia on passing through expansion valve 76, the resulting temperature falling to −54° F. The expanded stream serves to chill the landfill gas countercurrently flowing in exchanger 46 and discharges at 15° F. via pipe 77 into degassing separator 78. The off gas exiting separator 78 is about 95% carbon dioxide, 4% methane, and the remainder is a mixture of methanol, troublesome compounds and moisture in approximate proportions of 7 to 4 to 1, respectively.

The liquid from separator 49 at 293 psia and 39° F. is also flashed through valve 80 to 31 psia and 33° F. The liquid drawn from separator 78 is 77.6% methanol, 9.9% water, 8.3% troublesome compounds and 4.2% carbon dioxide flows into decanter 73 and there mixes with water from separator 71. The methanol solution containing troublesome compounds from separator 78 is so diluted by water from separator 71 that the troublesome compounds being basically organic and hydrophobic come out of solution and form an upper layer that is drawn via pipe 82 for proper disposal.

The aqueous methanol of the lower layer at 31 psia and 50° F. is recirculated by pump 84 to heat exchanger 86 from which it issues at 300 psia and 220° F. for injection into the compressed landfill gas in pipe 37. The resulting vaporization followed by cooling in exchanger 38 produces condensate, essentially only water, that is removed in separator 40. As previously pointed out, concentration of the methanol in the recycled aqueous stream is achieved in effect by fractionation that eliminates water.

The landfill gas delivered by pipe 63 as fuel for combustion engines has had 85% of its original content of troublesome compounds removed. This substantial elimination of troublesome compounds so materially reduces corrosion in the engines that the running period between repair stoppages is more than doubled and in some cases is even quadrupled.

As illustrated by the example, the cryogenic treatment of landfill gas comprises compressing the gas to at least 275 psia, preferably in the range of about 300 to 325 psia, cooling the hot compressed gas in two stages to a temperature near but above the freezing point of water, usually in the range of about 35° F. to 45° F., each stage being followed by separation of a substantially water condensate, further chilling the cooled gas with a small addition of methanol to a cryogenic temperature, preferably in the range of about −25° F. to −35° F., separating an aqueous methanol condensate containing troublesome compounds, further decreasing the temperature of the separated chilled gas and separated chilled aqueous methanol by isenthalpic expansion, and passing both the further chilled expanded gas, which is the treated product gas, and the further chilled expanded aqueous methanol in heat exchange with the cooled compressed gas.

Preferably, the process includes recycling the aqueous methanol after dilution with water to cause the troublesome compounds to drop out of solution and form a supernatant layer on the diluted aqueous methanol. The diluted aqueous methanol is then recycled by injection into the hot compressed landfill gas before the first-stage cooling thereof. Incidental losses of methanol are compensated by injection of fresh methanol into the cooled compressed gas before it is chilled to a cryogenic temperature.

Landfill sites where the gas is being inadequately processed by cooling with external refrigeration to a temperature near but above the freezing point of water, shown in the appended flowsheet as Prior Art, can advantageously use the existing refrigerated exchanger 24 in adopting the cryogenic process of this invention. In such case, refrigerated exchanger 24, which is any expensive apparatus, would be utilized in the new process by insertion in pipe 48 to decrease the temperature of the compressed landfill flowing therethrough. This use of prior existing exchanger 24 in the new process is simply represented in the flowsheet by dotted circle 24A in pipe 48.

Because of the refrigeration applied to the gas stream 48, it is not necessary to compress the landfill gas to a pressure of at least 275 psia that is required to reach the desired cryogenic temperature solely by isenthalpic expansion. With external refrigeration supplied at 24A, compressor 36 only needs to compress the gas to a lower pressure in the range of about 125 to 200 psia. Thus, compressor 36 becomes a lighter-duty and less-expansive machine. At the lower pressure, the landfill gas must ultimately be chilled to a lower temperature in the range of about −45° F. to −55° F. To summarize, while the purchase of a refrigerated exchanger for use at 24A in a new plant is not considered economically justified, the existing refrigerated exchanger of an old plant is advantageously utilized at 24A in a new replacement plant for carrying out the novel process of removing troublesome compounds from landfill gas.

Variations and modifications of the invention as described in its preferred embodiment will be apparent to those skilled in the art without departing from the spirit or scope of the invention. For instance, degassing separators 71, 78 can be omitted if decanter 73 is large enough to tolerate degassing therein. Of course, if methanol is considered expendable, recycling is eliminated by omitting apparatus units 71, 73, 78, 84, 86 and the pipes connected therethrough. Even the omission of exchanger 46 is possible if the liquid stream of pipe 75 can be sent to disposal without concern for the resulting loss of methanol. Accordingly, only such limitations should be imposed on the invention as are set forth in the appended claims.

What is claimed is:

1. A cryogenic process for removing moisture and troublesome compounds from landfill gas by chilling said gas to a temperature below −20° F., which comprises compressing said gas to an elevated pressure, cooling the compressed gas to form a first water condensate, separating said first condensate from said compressed gas, further cooling said compressed gas to form a second water condensate, separating said second condensate from said compressed gas, injecting methanol into said compressed gas, chilling said compressed gas containing said methanol to a temperature below −20° F. to form a methanol-rich condensate containing said troublesome compounds, separating said methanol-rich condensate from said chilled compressed gas, isenthalpically expanding said chilled compressed gas, and using the thus further chilled expanded gas to effect the aforesaid chilling of said compressed gas containing said methanol and then to effect the aforesaid further cooling of said compressed gas.

2. The process of claim 1 wherein the methanol-rich condensate is used in chilling the compressed gas containing methanol, is expanded isenthalpically and warmed to form a gas phase and a liquid phase, water is mixed with the liquid phase to form a supernatant layer containing troublesome compounds and a lower aqueous methanol layer, and said aqueous methanol is recycled by injection into the compressed gas prior to the cooling thereof.

3. The process of claim 2 wherein the second water condensate and part of the first water condensate are degassed and used as the water that is mixed with the liquid phase.

4. The process of claim 2 wherein the compressed gas is cooled to a temperature that forms a first water condensate with a methanol content much less than that of the recycled aqueous methanol.

5. The process of claim 1 wherein the landfill gas is compressed to a pressure in the range of about 300 to 325 psia, and the compressed gas is cooled to a temperature not exceeding about 110° F. to form a first water condensate.

6. The process of claim 5 wherein the cooled compressed gas is further cooled to a temperature in the range of about 35° F. to 45° F., and is chilled to a temperature in the range of about −25° F. to −35° F.

7. A cryogenic process of reducing the moisture and troublesome compounds content of landfill gas, which comprises compressing said landfill gas to an elevated pressure, cooling the compressed gas to a temperature not exceeding about 110° F. to form a first water condensate, separating said first condensate from said compressed gas, further cooling said compressed gas to form a second water condensate, separating said second condensate from said compressed gas, injecting methanol into said compressed gas at temperature in the range of about 35° F. to 45° F., chilling said compressed gas containing methanol to a cryogenic temperature below −20° F. to form a methanol-rich condensate containing said troublesome compounds, separating said methanol-rich condensate from the chilled compressed gas, expanding said chilled compressed gas isenthalpically, and using the expanded gas to effect both the aforesaid chilling of said compressed gas and the aforesaid further cooling of said compressed gas.

8. The process of claim 7 wherein the elevated pressure is in the range of about 275 to 325 psia, and the cryogenic temperature is in the range of about −25° F. to −35° F.

9. The process of claim 8 wherein the methanol-rich condensate is expanded isenthalpically and passed in heat-exchange with the compressed gas after the second water condensate has been separated therefrom, the expanded methanol-rich condensate is degassed and mixed with water to form an upper liquid layer containing the troublesome compounds and a lower aqueous methanol layer, and recycling said aqueous methanol by injection into the compressed gas prior to the cooling thereof.

10. The process of claim 9 wherein the recycled aqueous methanol is heated and injected into the compressed gas prior to the cooling thereof to effect substantially complete vaporization of said aqueous methanol.

11. The process of claim 7 wherein the elevated pressure is in the range of about 125 to 200 psia, external refrigeration is applied to the compressed gas after the separation of the second water condensate therefrom, and the cryogenic temperature is in the range of about −45° F. to −55° F.

12. The process of claim 11 wherein the methanol-rich condensate is expanded isenthalpically and passed in heat exchange with the compressed gas after the second water condensate has been separated therefrom, the expanded methanol-rich condensate is degassed and mixed with water to form an upper liquid layer containing the troublesome compounds and a lower aqueous methanol layer, and recycling said aqueous methanol by injection into the compressed gas prior to the cooling thereof.

* * * * *